Jan. 2, 1934.  H. FRÖHLICH ET AL  1,942,164
INDUCTION METER
Filed Aug. 1, 1930
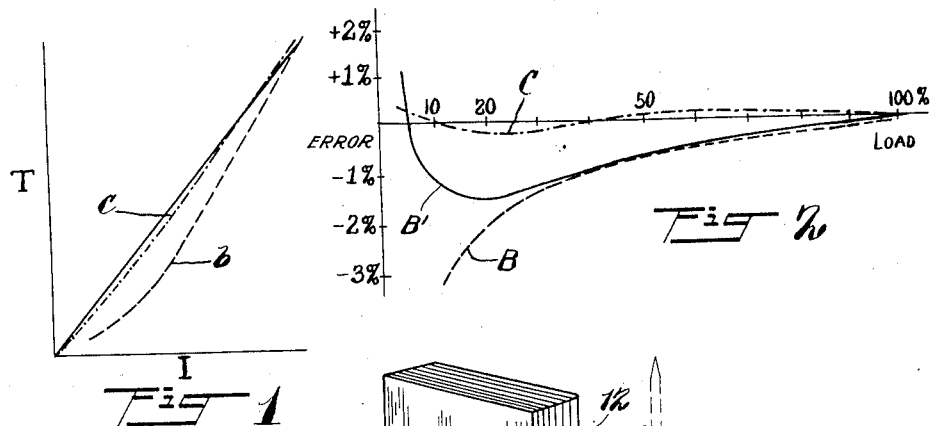
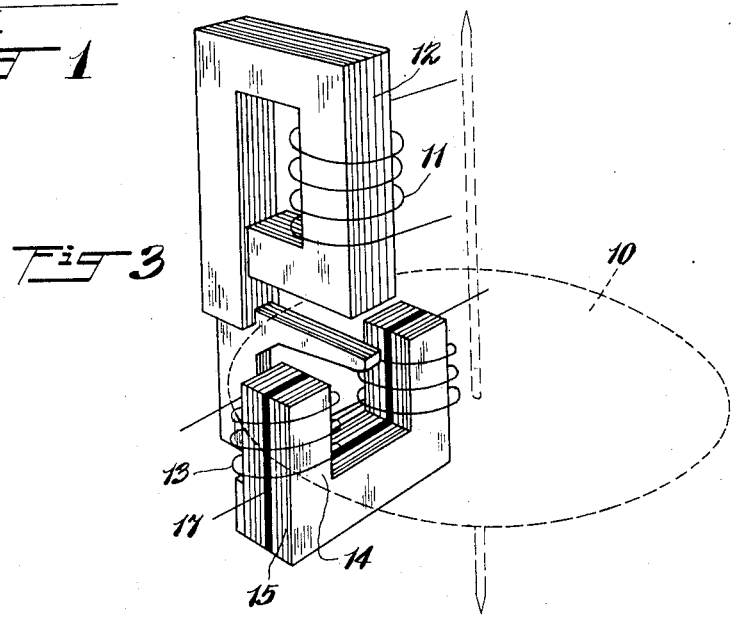
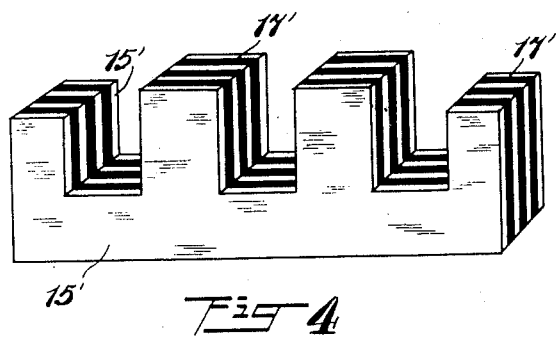
INVENTORS
H. Fröhlich, P. Hauschard
BY W. Zingg.
John D. Morgan
ATTORNEY Patented Jan. 2, 1934

1,942,164

UNITED STATES PATENT OFFICE 1,942,164

INDUCTION METER

Hans Fröhlich, Theodor Hausch, and Werner Zingg, Zug, Switzerland, assignors to Landis & Gyr, A.-G., Zug, Switzerland, a corporation of Switzerland Application August 1, 1930, Serial No. 472,317, and in Switzerland August 24, 1929

2 Claims. (Cl. 171—264)

The present invention relates to induction meters and more particularly to improvements in induction meters whereby the characteristic performance of such meters is improved and errors in registration are greatly reduced.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrates one embodiment of the invention, and together with the description, serves to explain the principles of the invention.

Of the drawing:

Figure 1 is a diagram showing curves which represent torque plotted against current strength;

Figure 2 is a diagram showing characteristic performance curves plotted against load;

Figure 3 is a diagrammatic view illustrating an induction meter in accordance with the present invention; and Figure 4 is a diagrammatic view of a modified embodiment of a meter core in accordance with the present invention.

The present invention has for its object the provision of an induction meter, such as a Ferraris meter, having a very small error. A further object is the provision of a meter core for induction meters which will eliminate all but a negligible error in the measurement of energy even at very low loads.

In induction meters, the permeability of the magnetic current core varies, to an appreciable extent, with the load which is imposed on the meter introducing an error in the ratio between the current flowing through the meter coils and the driving flux resulting from the current. This divergence becomes the more noticeable, the longer the path of the driving flux through the magnetic core or the shorter the path of the flux through air. For this reason, it is necessary to arrange the meter parts so as to make the air passage opposite the core path as large as possible. The influence of the core cannot, however, be entirely eliminated in this manner.

Heretofore, it has been customary to form meter cores of dynamo sheet iron which has a relatively low permeability reaching a maximum at the steepest point of the magnetization curve and diminishing considerably in the region of saturation. In induction meters, and with particular reference to the path of the current flux, only the lower point of the magnetization curve is of particular importance. The resultant torque does not follow a straight-line curve with the current but deviates therefrom, as shown in curve $b$ of Figure 1. As seen from this curve, the torque is much too small at low loads, causing the characteristic performance curve to be similar to curve B of Figure 2.

The large negative error of curve B can be partially eliminated by employing a constant supplemental torque, such as the so-called voltage drive, which partially corrects for the error of curve B, and produces a characteristic performance represented by curve B' of Figure 2. This curve shows a dip between 10% and 50% of full load which is caused by the influence of the current driving flux on the core.

To correct for these errors, the meter cores of induction meters in accordance with the present invention are formed of magnetic material having a high initial permeability, or in part of such material combined with magnetic material having a relatively low initial permeability. Preferably, and in accordance with the illustrative embodiment of the invention, the current core is laminated and certain of the laminæ are of electrolytic iron or an iron-nickel alloy having a high permeability, and these laminæ are interposed between other laminæ of a material having a low initial permeability, such as dynamo sheet iron.

The present invention permits a reduction in the ampere turns necessary on the magnetic core and results in a more nearly linear relation between the current and current driving flux so that, in the case of small loads, the reduction in driving torque becomes correspondingly smaller, as shown by curve $c$ of Figure 1. Due to this, the characteristic performance curve, curve C of Figure 2, is substantially straight over the entire load range and the dip in curve B' completely disappears, indicating that the error is so small as to be negligible for practical purposes.

While many different materials are suitable for the construction of meter cores in accordance with the present invention, and will produce a characteristic performance curve which is practically constant over a wide range of loads and particularly at small loads, we have found that iron-nickel alloys in general and electrolytic iron are particularly suited to the construction of the cores. The relative amount of material having a high initial permeability is determined by its effect on the characteristic performance curve, and with certain materials and in certain types of meters, the entire core should be of this material. In other types of meters, a substantially errorless characteristic performance curve was found to result by making one third of the laminæ of the current core of an iron-nickel alloy containing 80.5% nickel and 19.5% iron.

It will be understood that the foregoing general description, and the following detailed description as well, are exemplary and explanatory of the invention, but are not restrictive thereof.

Referring now in detail to the present preferred embodiment of the invention as diagrammatically illustrated in Figure 3 of the accompanying drawing, the invention is shown as applied to a conventional induction meter of the Ferraris type in which a meter disc 10 is driven proportionally to the metered energy by the driving system which includes the voltage coil 11 and core 12, and the current coil 13 and cores 14. In accordance with the present invention, the meter cores are formed at least in part of a material having a high initial permeability, and in the present and preferred embodiment, the current core 14 is formed of a plurality of laminæ 15 of dynamo sheet iron of the kind customarily employed in the manufacture of meter cores and having a relatively low permeability. Between the laminæ of dynamo sheet iron is interposed one or more similarly shaped laminæ 17 of electrolytic iron or an iron-nickel alloy, having a relatively high permeability.

Figure 4 of the drawing illustrates a modified form of current core for an induction meter in which alternate laminæ 17' are formed of electrolytic iron or the iron-nickel alloy and are interposed between laminæ of dynamo sheet iron 15'.

The invention in its broader aspects is not limited to the specific mechanisms shown and described but departures may be made therefrom within the scope of the accompanying claims without departing from the principles of the invention and without sacrificing its chief advantages.

What we claim is:—

1. An induction meter including in combination a meter disc and driving means therefor including voltage and current coils and a laminated core in which at least a portion of the laminæ are formed of electrolytic iron having a high initial permeability.

2. An induction meter including in combination a meter disc and driving means therefor including voltage and current coils and a laminated core in which alternate laminæ are formed of electrolytic iron and the remaining laminæ are formed of dynamo sheet iron.

HANS FRÖHLICH.
THEODOR HAUSCH.
WERNER ZINGG.